(12) United States Patent
Karakotsios et al.

(10) Patent No.: US 9,201,585 B1
(45) Date of Patent: Dec. 1, 2015

(54) USER INTERFACE NAVIGATION GESTURES

(71) Applicants: Kenneth M. Karakotsios, San Jose, CA (US); David W. Stafford, Cupertino, CA (US)

(72) Inventors: Kenneth M. Karakotsios, San Jose, CA (US); David W. Stafford, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 156 days.

(21) Appl. No.: 13/621,823

(22) Filed: Sep. 17, 2012

(51) Int. Cl.
*G06F 3/0488* (2013.01)

(52) U.S. Cl.
CPC .................................. *G06F 3/0488* (2013.01)

(58) Field of Classification Search
CPC .............................. G06F 3/017; G06F 3/0488
USPC .......................................................... 715/736
See application file for complete search history.

(56) References Cited

U.S. PATENT DOCUMENTS

| | | | |
|---|---|---|---|
| 2009/0103780 A1* | 4/2009 | Nishihara et al. | 382/103 |
| 2010/0050133 A1* | 2/2010 | Nishihara et al. | 715/863 |
| 2010/0125815 A1* | 5/2010 | Wang et al. | 715/856 |
| 2011/0254792 A1* | 10/2011 | Waters et al. | 345/173 |
| 2012/0084712 A1* | 4/2012 | Gimpl et al. | 715/788 |
| 2012/0117495 A1* | 5/2012 | Sirpal et al. | 715/761 |
| 2012/0304121 A1* | 11/2012 | Cahill et al. | 715/815 |
| 2013/0067392 A1* | 3/2013 | Leonard et al. | 715/784 |
| 2013/0067420 A1* | 3/2013 | Pittappilly et al. | 715/863 |
| 2013/0201098 A1* | 8/2013 | Schilit et al. | 345/156 |
| 2013/0239019 A1* | 9/2013 | Pike et al. | 715/753 |
| 2013/0259238 A1* | 10/2013 | Xiang et al. | 381/17 |

OTHER PUBLICATIONS iphoneate, "Activator 1.7.0-beta1", Sep. 15, 2012, http://iphoneate.com/activator-1-7-0-beta1#.UyrMmcX7Lco.*
iPod Touch, Examiner provided screenshots of Activator 1.7.0 beta 1 installed in an iPod Touch model MC547LL/A.*
iphoneate, "Activator 1.7.0-beta1", Sep. 15, 2012, http://iphoneate.com/activator-1-7-0-beta1#.UyrMmcX7Lco.*
iPod Touch, Examiner provided screenshots of Activator 1.7.0 beta 1 installed in an iPod Touch model MC547LL/A, Activator 1.7.0 beta1 available on Sep. 15, 2012, screenshots were taken on Mar. 20, 2014.*

* cited by examiner

*Primary Examiner* — William Bashore
*Assistant Examiner* — Daniel Rodriguez
(74) *Attorney, Agent, or Firm* — Novak Druce Connolly Bove + Quigg LLP

(57) ABSTRACT

Various embodiments enable a user to navigate between various hierarchical or functional levels of a computing device by providing a hand gesture, such as a multiple finger pinch or splay. For example, a user viewing an application page on an interface of a computing device can leave the application page and navigate to the home page with a single hand gesture. Accordingly, the same hand gesture could be subsequently used to navigate the user to a higher functional level, such as a network level, a disk utility level, and the like. A multiple finger pinch or splay can also be utilized as a trigger to reveal an application's chrome, reveal running applications, provide a short-cut to accessing favorite applications or notes, or to provide alternative views or organization schemes for applications, documents, and the like.

24 Claims, 7 Drawing Sheets

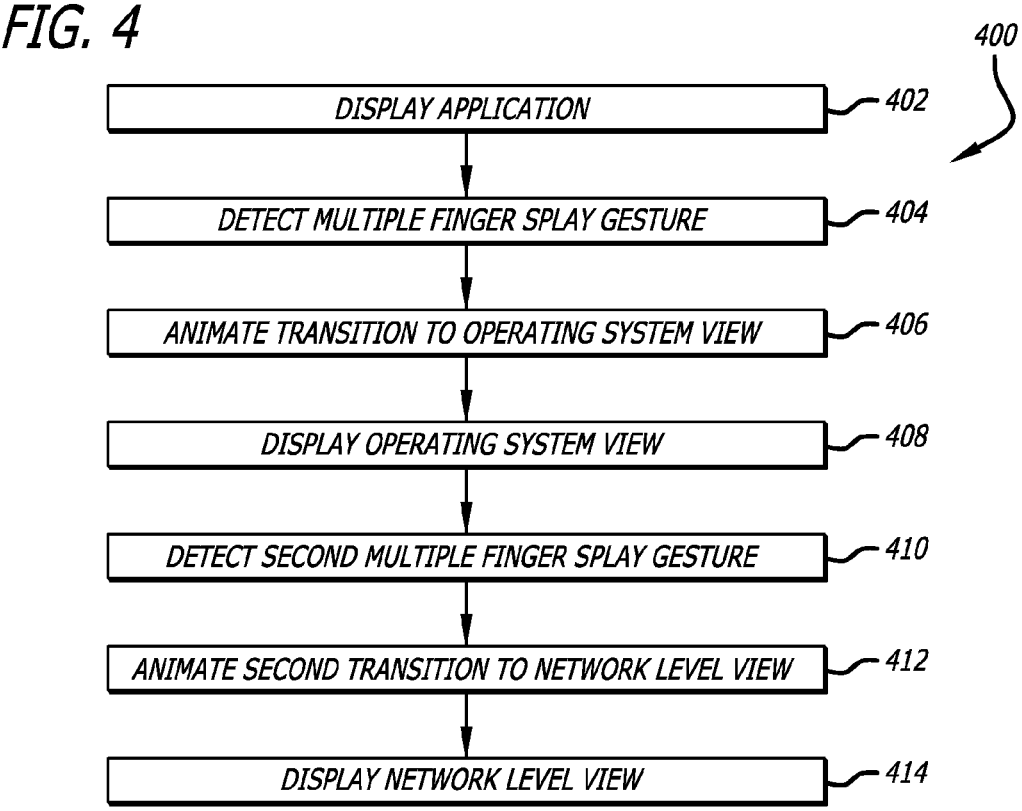
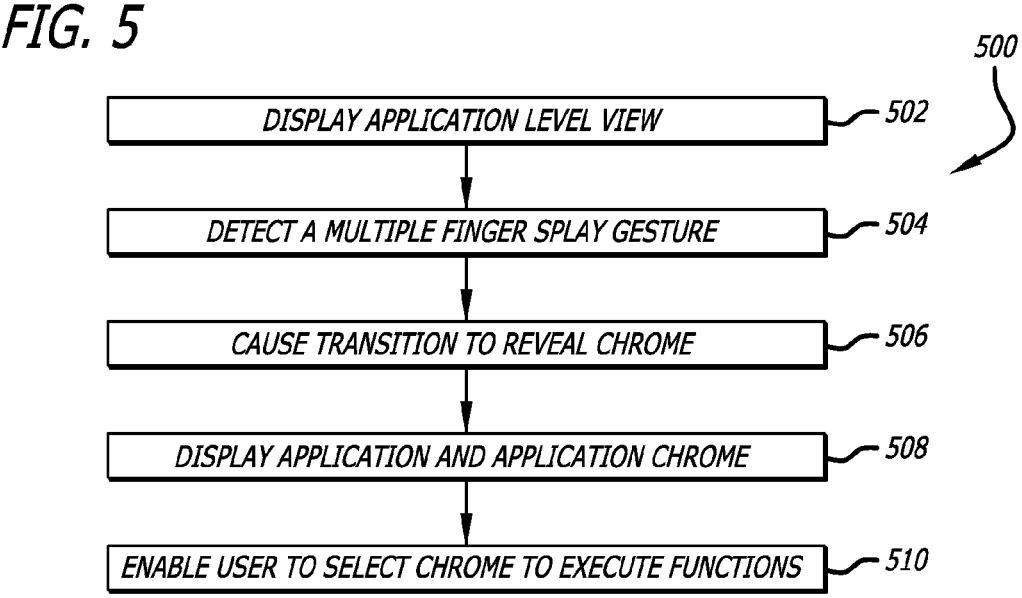

USER INTERFACE NAVIGATION GESTURES

BACKGROUND

Users are increasingly relying upon various electronic and computing devices to store, track, and update various types of information and handle various types of tasks. For example, many users rely upon computing devices to store, organize, and control various types of data, devices, and other such information. Unfortunately, information is often not organized or presented in a way that is intuitive for many users. Further, for portable computing devices such as smart phones or tablet computers, the screen size can be limited such that it can be difficult for a user to locate information due to the size of the various icons or elements with respect to the size of a user's finger. As technology advances and as people are increasingly using portable computing devices in a wider variety of ways, it can be advantageous to adapt the ways in which users interact with these devices and the ways in which users access various types of information.

BRIEF DESCRIPTION OF THE DRAWINGS

Various embodiments in accordance with the present disclosure will be described with reference to the drawings, in which:

FIG. 4 illustrates an example process for enabling a user to interact with a computing device that can be used in accordance with at least one embodiment;

FIG. 5 illustrates another example process for enabling a user to interact with a computing device that can be used in accordance with at least one embodiment;

DETAILED DESCRIPTION

Figure 1:
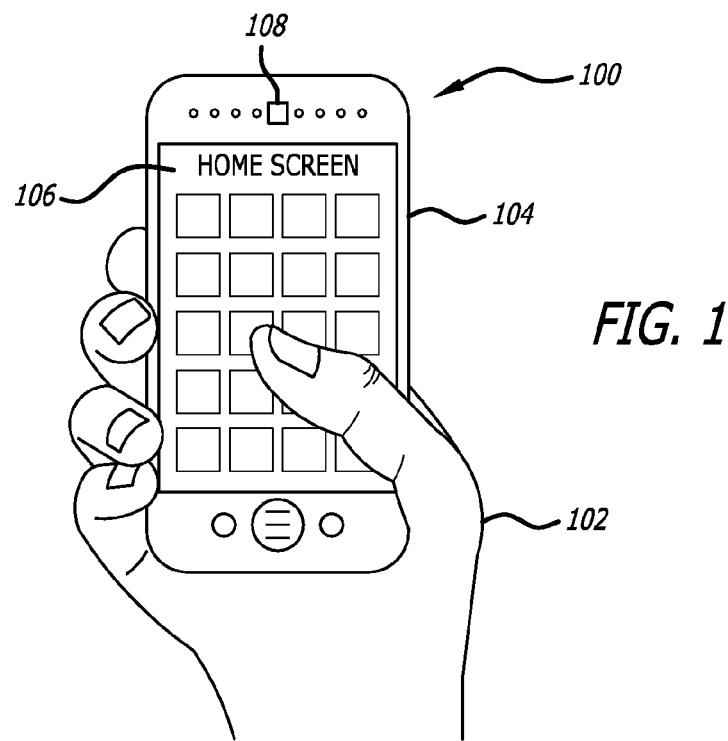
FIG. 1 illustrates an example situation of a user holding a computing device in accordance with at least one embodiment.

Systems and methods in accordance with various embodiments of the present disclosure may overcome one or more of the aforementioned and other deficiencies experienced in conventional approaches to enabling a user to interact with a computing device. In particular, various approaches enable a user to navigate between various hierarchical or functional levels accessible within a computing device by providing a hand gesture, such as a multiple finger pinch or splay. In at least some embodiments, a pinch or splay gesture is performed by a user in order to initiate a transition a change from one functional level, such as an application page, to a second functional level, such as an operating system level view of the computing device. For example, a user viewing an application page on an interface of a computing device can leave the application page and navigate to the home page with a splay gesture. Accordingly, subsequent use of the same splay gesture could navigate the user from the home page to a higher functional level, such as a network level, a disk utility level, and the like. In at least some embodiments, a pinch or splay gesture is performed by a user with multiple fingers on a touch display or within view of an imaging element a distance from the computing device.

Given the limited amount of display screen real-estate, a gesture such as a pinch or splay gesture (two-finger, multiple-finger, or five-finger) can be used to reveal running applications, provide a short-cut to accessing favorite applications or notes, or to provide alternative views or organizational schemes for applications, documents, and other user folders. Such approaches can provide for an extended associative memory that enables a user (or application) to locate information using associations that are natural and/or intuitive to that user. In at least one embodiment, the ability to navigate using pinch or splay gestures can be made available to third party developers to apply the gestures to various application functions. For example, a multiple finger splay gesture could be used to reveal an application's chrome or other command and option functions. As briefly mentioned above, a method utilizing such a gesture can include detecting a gesture, such as a multiple finger splay gesture, while a user is viewing an application and animating a transition from the application to an operating system level, such as a home screen, of the computing device. Accordingly, the user can provide a second splay gesture to initiate a second animation to transition from the operating system view a lower functional level view of the computing device. Various embodiments also enable a user to access, view, search, and otherwise interact with the data across any functional levels with a gesture. For example, a user can utilize various different views to locate information that is of interest to the user, in a way that is more intuitive for the user. Various other approaches can be used as well as discussed or suggested elsewhere herein.

Various other functions and advantages are described and suggested below as may be provided in accordance with the various embodiments.

FIG. 1 illustrates an example situation 100 of a user 102 viewing a home screen of a computing device 104 that can be used in accordance with various embodiments. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. The computing device 104 in this example includes a front image capture element 108 and possible a back image capture element positioned on the device such that, with sufficient wide angle lenses or other such optics, the computing device 104 is able to capture image information in substantially any direction about the computing device. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, an electromagnetic field (EMF) sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

Computing devices with limited display screen real-estate tend to have data and functionality divided into several hierarchies of functions and an interface can be thought of, therefore, as having multiple layers. An interface, as used herein, can refer to a range of different types of interfaces at different functional "levels" of a computing device. For example, a user may interface with or within an application, an operating system, or a network and other devices over the network. An application or other program running on the device can provide an interface for the user to interact with an operating system, a home screen, hardware, or a network. A home screen can provide an interface for the user to interact with various applications, hardware elements, and functional levels within a computing device. An operating system can provide an interface for the user to interact with pieces of hardware, networks, and so on. In order to navigate through the various functional levels within an application, home screen, device, or network, conventional navigation approaches require a user to locate and make selections by contacting an element with a user's finger, such as requiring a user to scroll around, select a 'done' icon, press a button to return to a home page, or otherwise switch views multiple times to find the right data or functionality. An effective user interface would ideally enable the user to quickly navigate between layers in order to access desired data or functionality.

Figure 2A:
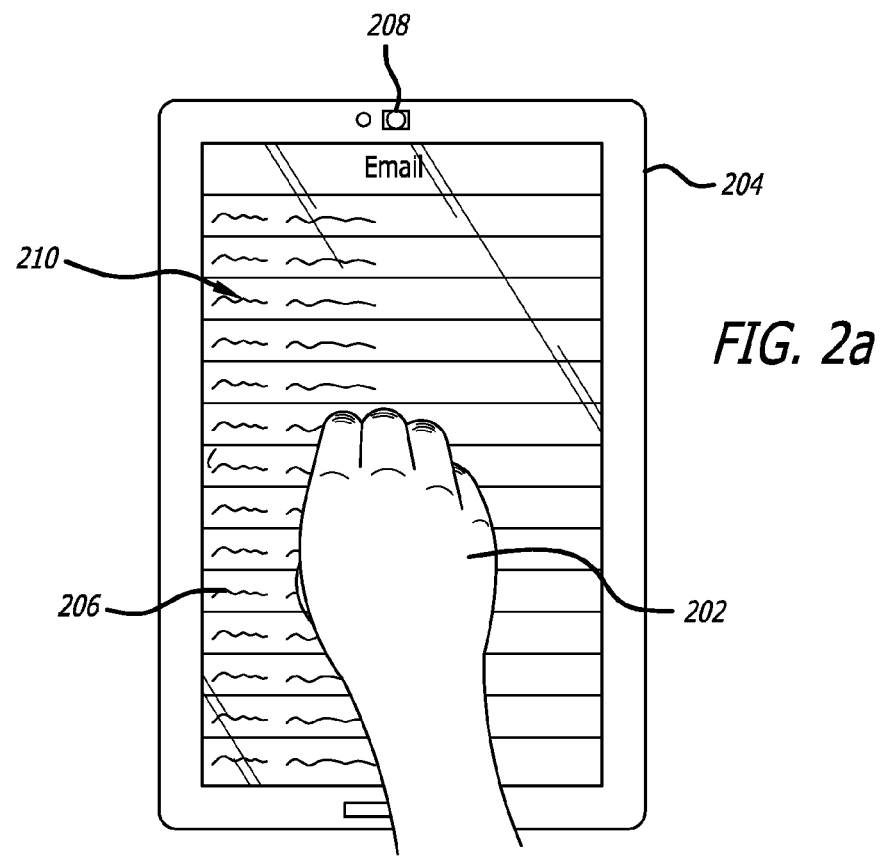
FIGS. 2(a)-2(d) illustrate example situations of a user interacting with a computing device in accordance with at least one embodiment.
Figure 2B:
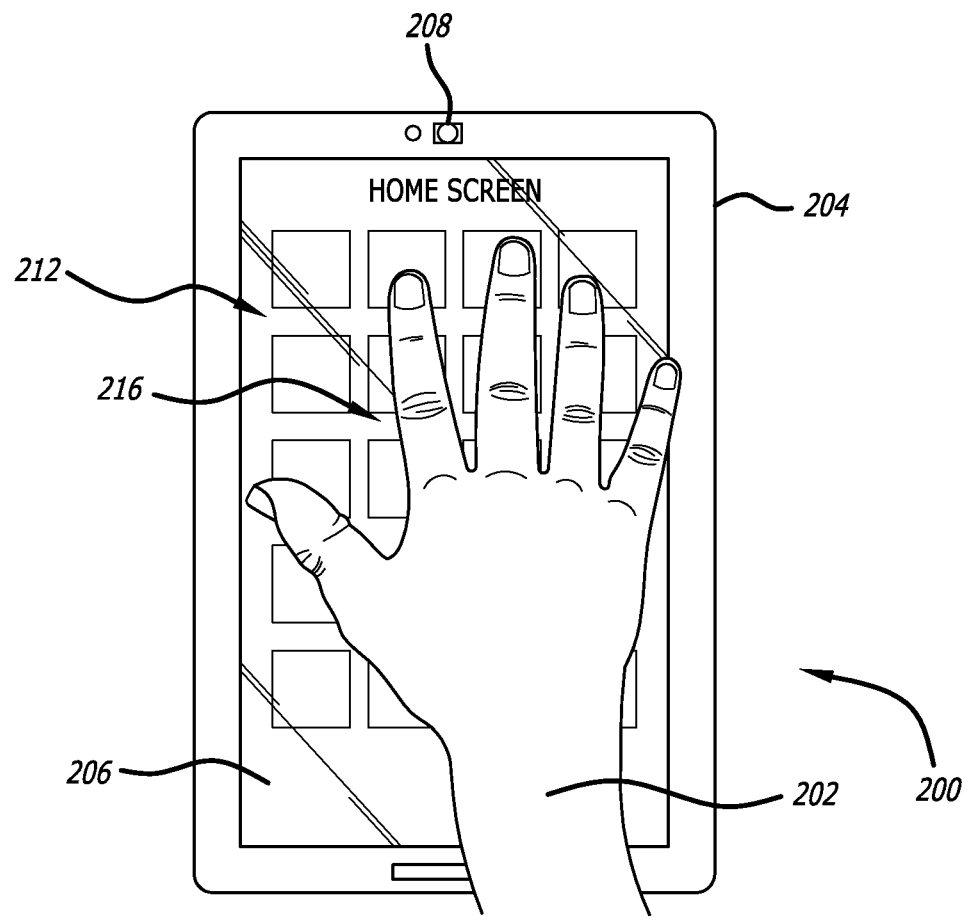
Figure 2C:
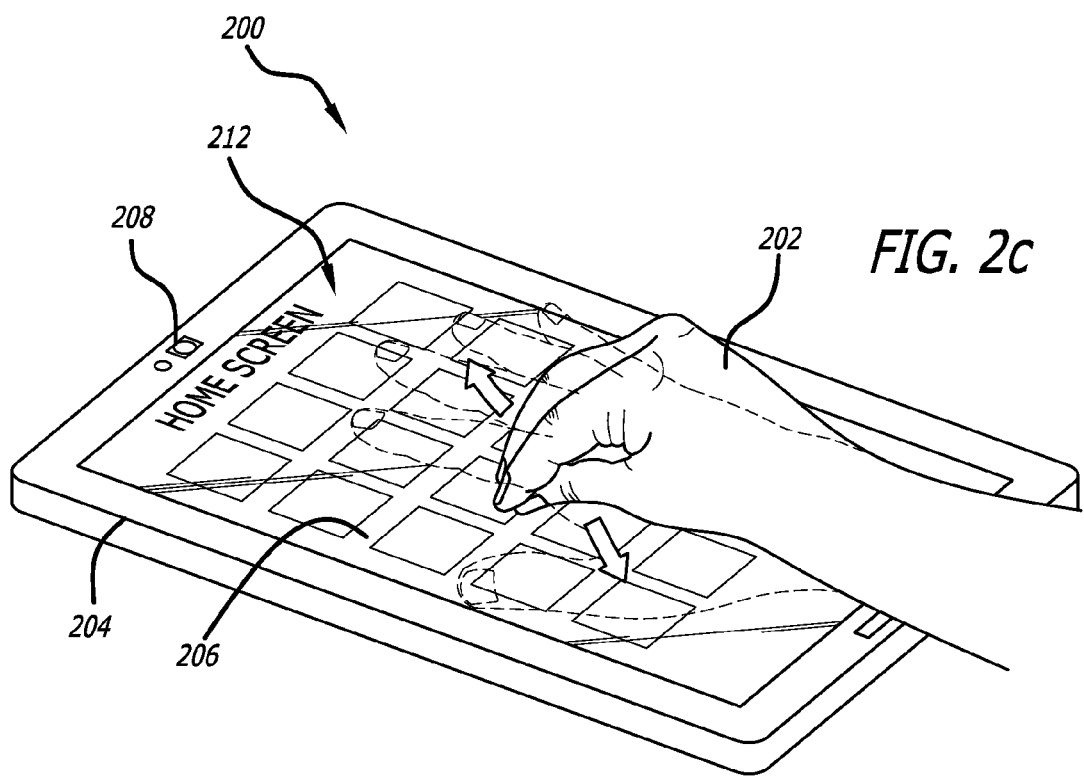
Figure 2D:
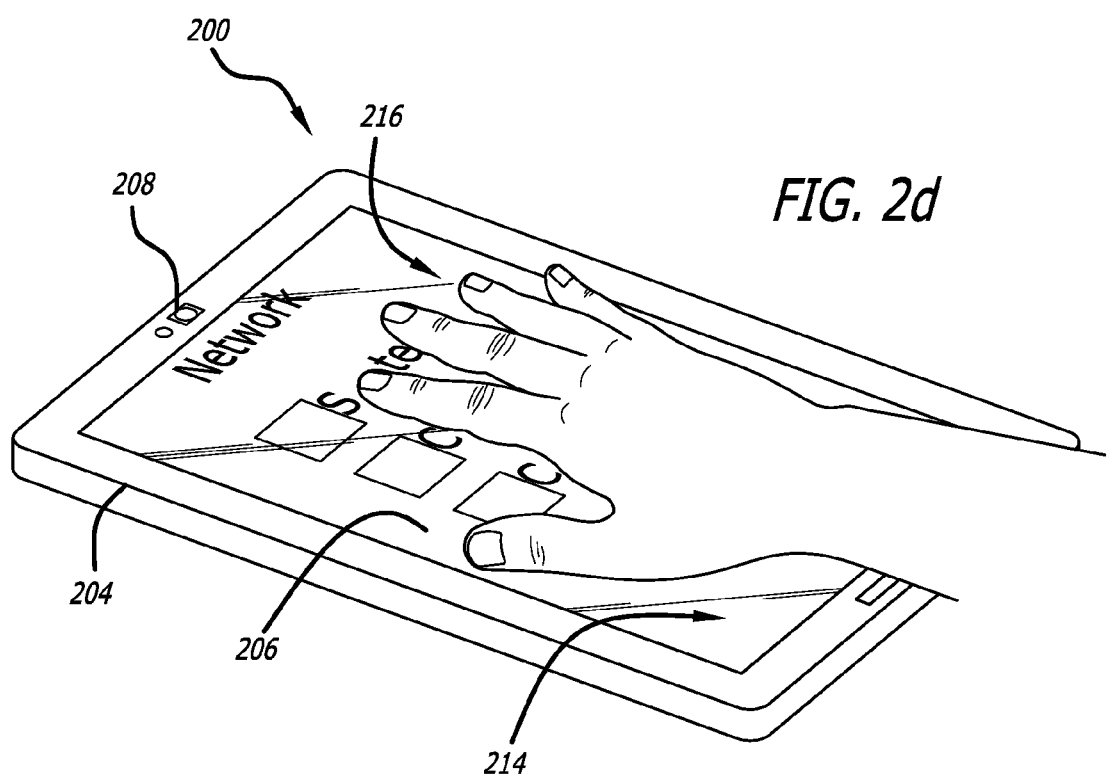

FIGS. 2(a)-2(d) illustrate an alternative navigation approach that can be used in accordance with various embodiments. FIG. 2(a) illustrates an example situation 200 where a user 202 is viewing (or is inside) an email application 210 displayed on a display element 206 of the computing device 204. In this example, instead of tapping a button or specific region on the display element 206 to return to a home screen, the user 202 can provide a multiple finger splay gesture on the display element 206 to navigate from the email application to a home screen. The multiple finger splay gesture, in this example, includes the user's finger tips initially touching each other and in contact with the display element 206, as shown in FIG. 2(a), and the user, subsequently, spreading or stretching the fingers to open the user's hand wide, as shown in FIG. 2(b), in a motion on the surface of the display element 206 detectable by a capacitive sensing element. In this example, FIG. 2(b) shows the user 202 with their fingers spread wide on the display screen 206, as the splay gesture is nearing completion or is completed, and, thus, revealing the home screen 212. Therefore, in this example, the user 202 can make the splay gesture while in an application 210 to navigate back to the home screen 212. Alternatively, instead of navigating to the home screen 212, the splay gesture could navigate the user to a higher functional level of the application 210 or another higher functional level of the computing device 204 other than the home screen 212. FIG. 2(c) illustrates a subsequent example situation in which the user 202 is viewing the home screen 212 on the display element 206 of the computing device 204 and navigates to a network level view 214 as shown in FIG. 2(d), with a subsequent splay gesture. A network level view 214, in one example, could reveal a map view showing where a user is in a building relative to the locations of other users who are sharing their locations. Therefore, the multiple finger splay gesture can be utilized as a shortcut from a lower functional level of the computing device, such as a specific application, to higher levels, such as a home screen, application/driver/document folder view, or network view. Various other approaches can be used as well as discussed or suggested elsewhere herein.

A user can, in various embodiments, provide a multiple finger splay gesture to navigate from lower functional levels, such as specific applications or document folders, to higher functional levels, such as a network view/access or other menus. In at least one embodiment, the splay gesture can return a user to a home screen then, upon detecting a subsequent splay gesture, lock the computing device by putting the device in a sleep or locked state. For example, a user within an application can provide a first splay gesture to return to a home screen and then provide a second splay gesture to lock the device. In one embodiment, a splay gesture can shrink a currently viewed application to a single tile among a set of tiles showing all/other running applications. The gesture could also display or reveal miniature views of all pages of a single application. In at least one embodiment, the multiple finger pinch and spay could be a micro-gesture used to navigate within various levels within a specific application, the multiple finger pinch and spay could a macro-gesture for navigating with the operating system, or a combination therewith. Therefore, the splay gesture can be used, in various embodiments, as a convenient way to navigate among and/or between various functional levels of a computing device quickly.

Additionally, a user can, in various embodiments, provide a multiple finger pinch, or similar gesture, to navigate in an opposite direction as the splay gesture. For example, the splay gesture could be for navigating from lower levels to higher levels and the multiple finger pinch gesture could be used in conjunction to navigate from a higher level, such as the network level, to a relative lower level, such as the home screen level. In some embodiments the opposite can occur, wherein a splay gesture causes the device to navigate to a lower level and a pinch causes the device to navigate to a higher level, such as where a user can zoom in and out to view more or less content. Therefore, a user can navigate in one direction with a splay gesture and navigate back with a pinch gesture and vice versa. A clutch gesture can be used to indicate to the device whether to pay attention to a splay or a pinch, as the motion to prepare for one could inadvertently be interpreted as the other. Alternatively, a clutch could be used to switch between navigation directions for a single splay or pinch gesture. For example, the user could use a multiple finger splay gesture to navigate from a home screen to a network view, then, provide a clutch, and navigate from the network view back to the home screen with a subsequent splay gesture. The clutch could be a separate touch gesture, such as a multiple finger twist. For example, a multiple finger twist in one direction could provide the clutch for one navigation direction and a twist in the opposite direction could provide the clutch to oppositely switch the navigation direction. Further, a user could customize which gestures navigate a user to a particular level. For example, a user may frequent the network level and choose to provide a gesture as a shortcut thereto no matter what functional level the user is currently viewing. In another example, a user could choose or customize a gesture to navigate between the various functional levels. In at least one embodiment, a number of fingers used when performing a multiple finger splay gesture can be used to determine which functional level the user is navigated to, such as three fingers could navigate a user one level, four fingers could navigate a user two levels, and five fingers could navigate a user three levels. For example, a user within an application could provide a four finger splay gesture to navigate directly to a network level. Various other touch gesture approaches or physically tactile clutches can be used as well as discussed or suggested elsewhere herein.

In some embodiments, instead of being detected by the capacitive sensing element, as illustrated above, the multiple finger splay gesture can detected above the computing device 204 by capturing and analyzing image information from an imaging element 208. Further, in at least some embodiments, the gesture could be detected above the display 206 by an electro-magnetic field (EMF) sensor or an ultrasonic sensor utilizing ultrasound technology. Therefore, the gestures discussed herein, in accordance with various embodiments, can be detected on screen by a capacitive touch element that is part of a display screen stack, a distance above the display screen using image information captured from an image capturing element, or a distance above the display screen using data from an EMF sensor.

Figure 3A:
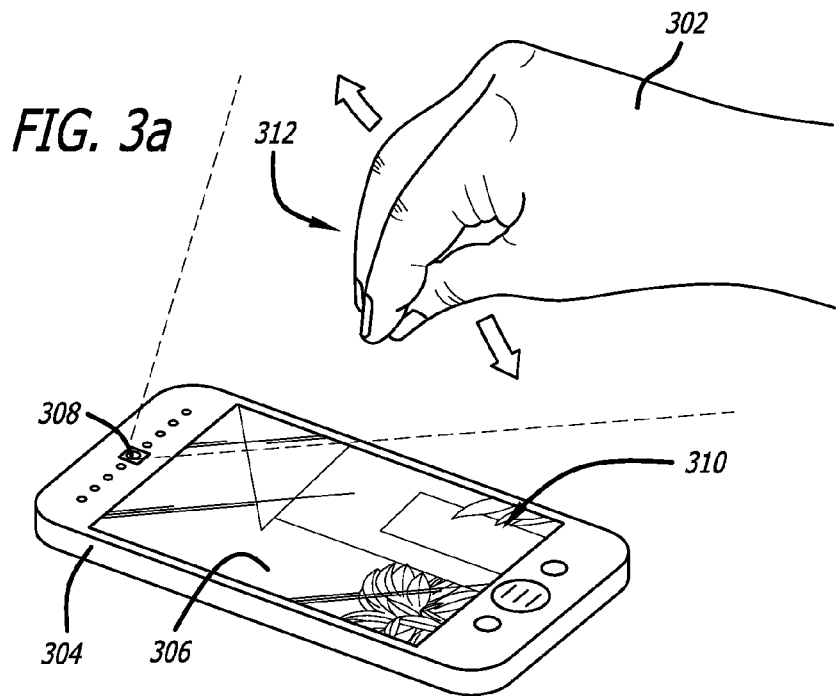
FIGS. 3(a)-3(b) illustrate another example situation of a user interacting with a computing device in accordance with at least one embodiment.
Figure 3B:
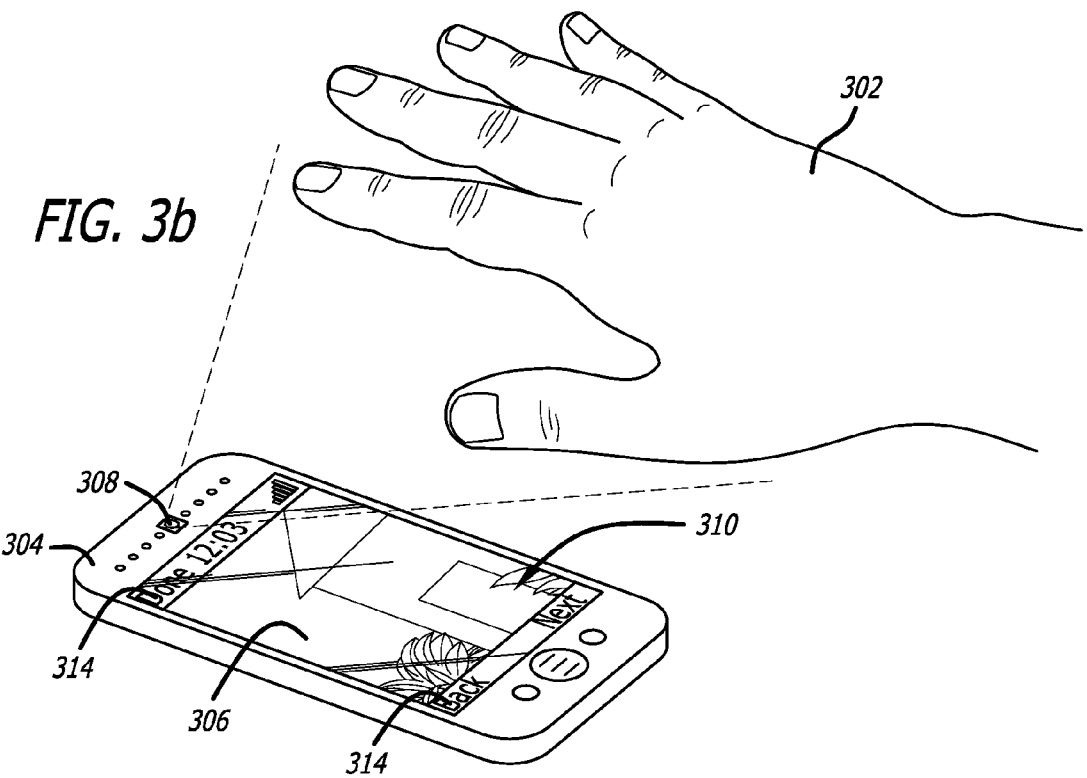

FIGS. 3(a)-3(b) illustrate an example situation 300 showing a user 302 performing a multiple finger splay gesture to reveal an application's chrome, in accordance with various embodiments. FIG. 3(a) illustrates an example situation where a user 302 is in an application which, in this example, is a photo viewing application or application with like functionality. Given the limited amount of display screen real-estate on many computing devices, application developers often hide graphical interface features of an application that can be revealed upon a trigger, such as a particular hand gesture. These interface features are sometimes referred to as "chrome." Chrome is the visual design elements that give users information about or commands to operate on the screen's content, as opposed to being part of that content. These design elements are generally provided by the underlying system, whether it is an operating system, a website, or an application and surround the user's data. Typically, the user interacts with information by manipulating visual widgets that allow for interactions appropriate to the kind of data they hold. The widgets of a interface are typically selected to support the actions necessary to achieve the goals of the user. When using application software, such as a word processor, the chrome is found in the menu bar, the ribbon or toolbars, rulers, scrollbars, and various specialized panes. In a web browser, the chrome includes the URL field, the browser toolbars, the browser buttons, the tabs, scrollbars, and status fields. In a mobile application, the chrome often includes a status bar across the top of the screen and a tab bar with command icons across the bottom. All of these item take up screen space, leaving less space for the target content or data. This is particularly bad on mobile devices, where screen space is at an even higher premium than on tablets or PCs.

In this example, the user 302, referring to FIG. 3(a), is viewing an image 310 associated with an application displayed on a display element 306. In order to maximize viewing area of the display 306, the application's chrome is hidden, in this example. In accordance with various embodiments, the application's chromes can be revealed or displayed upon detecting an appropriate gesture from the user 302 that is associated with revealing (or assigned to reveal) the chrome for the application. In this example, the user's hand is above the computing device 304 in view of an imaging element 308 in order to detect such an appropriate gesture. Therefore, the user's hand is closed in view of the camera 308 in FIG. 3(a) and the user's fingers are shown spread wide 312 in FIG. 3(b) in order to illustrate the user 302 performing a multiple finger splay gesture, in accordance with various embodiments. In this example, the multiple finger splay gesture is performed above the display 306 and is detected by the camera 308 to reveal the application's chrome 314 with (or on top of) the image 310 instead of tapping the display element 306 as is typical in some conventional devices. For example, such a gesture can be utilized in various map views and utilized with applications that utilize a geographic context (e.g. restaurant application when a user is near a particular restaurant). Various other image viewing applications, mapping applications, and the like can also be used in accordance with various embodiments. Various other approaches and applications can be used as well as discussed or suggested elsewhere herein.

In one example, a computing device is organized from a highest hierarchical level that includes a network level showing devices, a driver level, or other high level menu or folder view to a lowest hierarchical level, such as a specific application. In one example, a first (lowest) level may include the application; a second (higher) level may include a home screen with a view of multiple application and folders; and a third (highest) level may include a network view including a view of multiple devices and available networks. In at least some embodiments, a user can navigate from the first or second level to a lower level by performing a multiple finger splay gesture. Further, a multiple finger pinch gesture could be used in conjunction to navigate from a higher level, such as the network level, to a relative lower level, such as the home screen level. Therefore, a user can navigate in one direction with a splay gesture and navigate back with a pinch gesture and vice versa.

FIG. 4 illustrates an example process 400 for enabling gesture identification for such a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In at least some embodiments, an application page is displayed on an interface of a computing device 402. In this example, a multiple finger splay gesture from a user is detected 404. In response to detecting the multiple finger splay gesture, a transition from the application page to an operating system level view of the computing device is animated 406 and an operating system level view is displayed on the interface of the computing device 408. In this example, a second multiple finger splay gesture from the user is detected 410. In this example, a second transition from the operating system level view to a network level view of the computing device is animated 412 in response to detecting the second multiple finger splay gesture and the network level view is displayed to the user on the interface of the computing device 414. In this example, a user viewing the application page on an interface of a computing device can leave the application page and navigate to a home page with a single hand gesture. Accordingly, the same hand gesture could be subsequently used to navigate the user to a lower functional level, such as a network level, a disk utility level, and the like. Various other approaches can be used as well as discussed or suggested elsewhere herein.

FIG. 5 illustrates an example process 500 for enabling gesture identification for such a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In at least some embodiments, a first functional level, such as an application, is displayed on an interface of a computing device 502. In this example, a multiple finger splay gesture from a user is detected 504. The splay gesture can be detected on screen by a capacitive touch element that is part of a display screen stack, a distance above the display screen using image information captured from an image capturing element, or a distance above the display screen using data from an EMF sensor. Upon detecting the multiple finger splay gesture, a transition from the first functional level to a second functional level of the computing device is initiated 506 to reveal and display the second functional level, such as a view of the application and associated chrome, on the interface of the computing device 508. The user is enabled to interact with the second functional level, such as select the chrome to execute various application functions 510. The different functional levels can be associated with hierarchical levels within an operating system, such as between an application, home screen, disk utility, and network level, or within an application itself to reveal the application's chrome or other functional levels therein. Various other approaches can be used as well as discussed or suggested elsewhere herein.

Figures 6A, 6B:
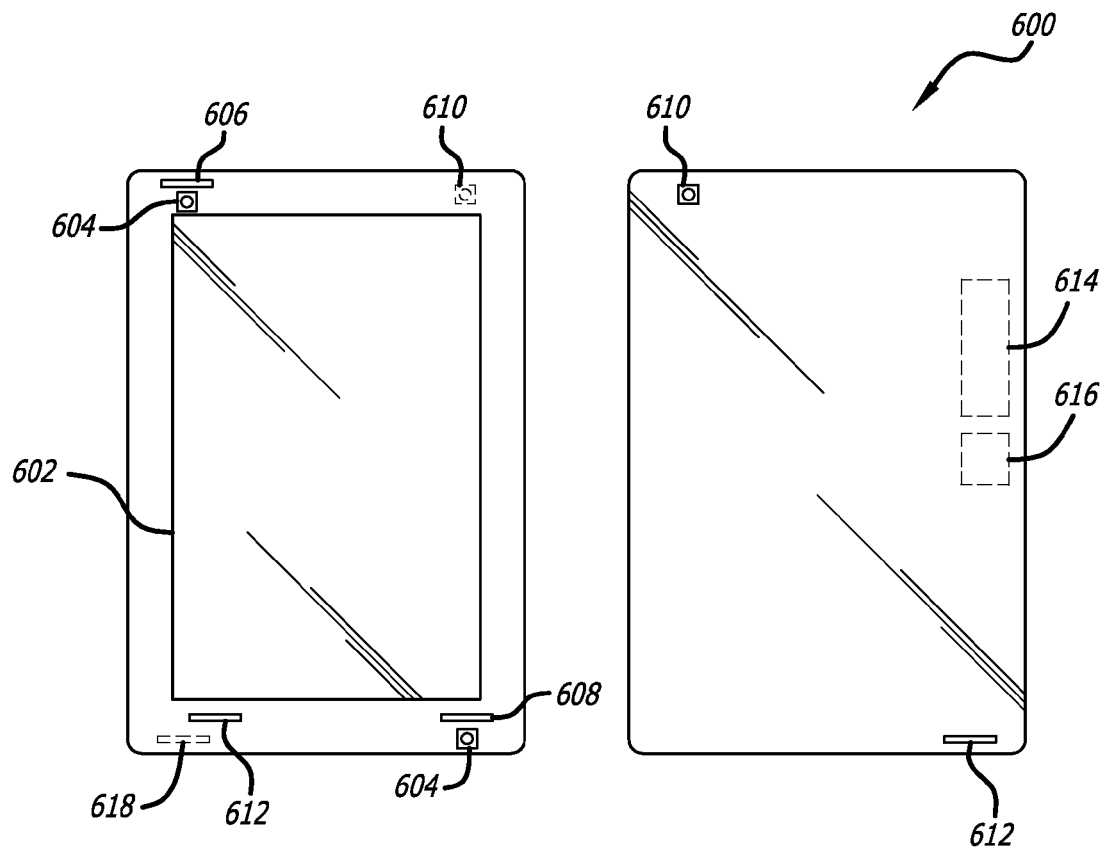
FIGS. 6(a) and 6(b) illustrate an example computing device that can be used to implement aspects of various embodiments.

FIGS. 6(*a*) and 6(*b*) illustrate front and back views, respectively, of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
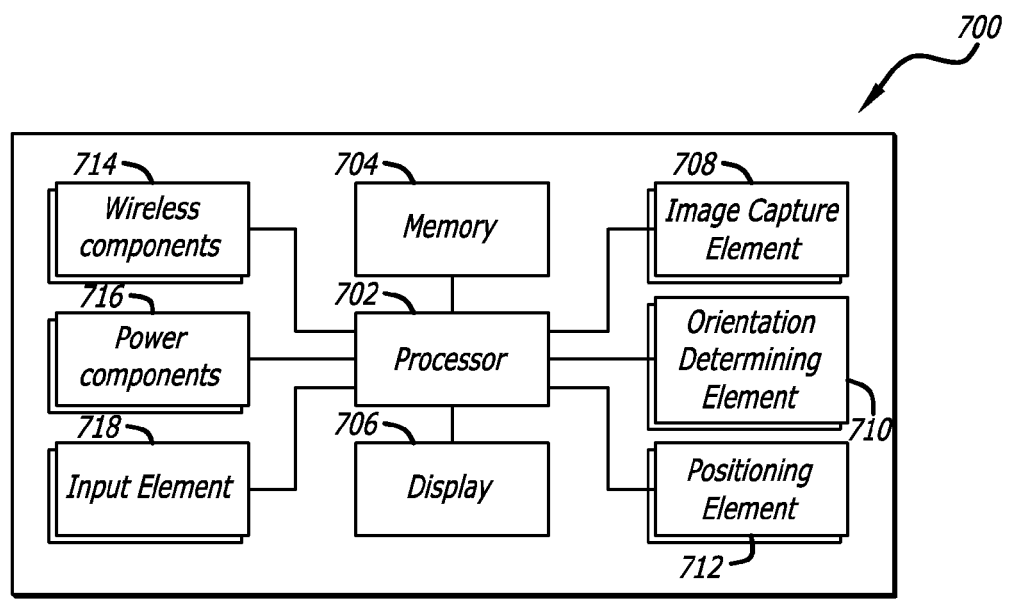
FIG. 7 illustrates example components that can be used with a device such as that illustrated in FIGS. 6(a) and 6(b)

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
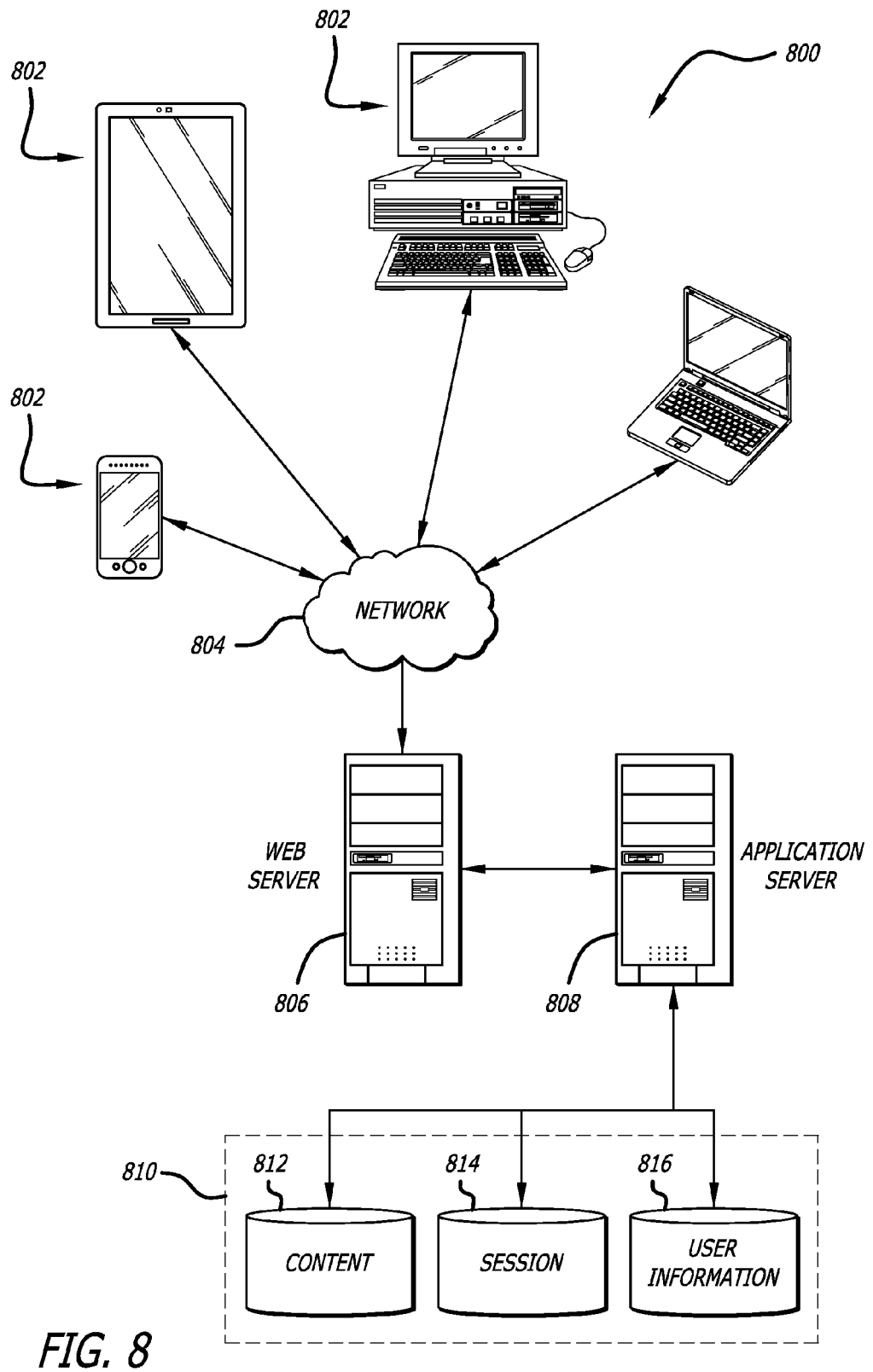
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
displaying a first functional level view on an interface of a computing device;
detecting a first multiple finger splay gesture performed by a user;
in response to detecting the first multiple finger splay gesture, animating a transition of a display from the first functional level view to a second functional level view of the computing device;
displaying the second functional level view on the interface of the computing device;
detecting a clutch input performed by the user, the clutch input to determine a navigation direction between functional levels among a plurality of functional levels;
after detecting the clutch input, detecting a second multiple finger splay gesture from the user, the clutch input being a different gesture from the first multiple finger splay gesture and the second multiple finger splay gesture;
in response to detecting the second multiple finger splay gesture, animating a second transition of the display from the second functional level view to the first functional level view of the computing device based upon the navigation direction in the detected clutch input; and
displaying the second functional level view on the interface of the computing device.

2. The computer-implemented method of claim 1, wherein the multiple finger splay gesture is detected by analyzing at least one image captured by at least one image sensor of the computing device.

3. The computer-implemented method of claim 1, wherein the interface is provided through a touch screen display and wherein the multiple finger splay gesture is detected through contact with the touch screen display.

4. A computer-implemented method, comprising:
under the control of one or more computer systems configured with executable instructions,
displaying content associated with a first functional level of an interface on a display of a computing device;
detecting a clutch input performed by a user, the clutch input to determine a navigation direction between functional levels among a plurality of functional levels;
after detecting the clutch input, detecting a multiple finger splay gesture performed by the user, the multiple finger splay gesture being a different gesture than the clutch input;
upon detecting the multiple finger splay gesture, causing a transition of the display from the first functional level to a second functional level of the interface based upon the navigation direction in the detected clutch input; and
displaying content associated with the second functional level of the interface.

5. The computer-implemented method of claim 4, wherein the interface is provided through a touch screen display and wherein the multiple finger splay gesture is detected through contact with the touch screen display.

6. The computer-implemented method of claim 4, wherein the multiple finger splay gesture is detected by at least one of an electro-magnetic field sensor, an ultrasonic sensor, or by analyzing at least one image captured by at least one image sensor of the computing device.

7. A computer-implemented method of claim 4, wherein the interface is at least one of an application, a home screen, a network, an operating system, or a file directory.

8. The computer-implemented method of claim 4, further comprising:
enabling the user to customize at least one of the first functional level or the second functional level.

9. The computer-implemented method of claim 4, wherein the computing device includes the plurality of functional levels and a number of fingers used when performing the multiple finger splay gesture determines which functional level among the plurality of functional levels is to be displayed to the user.

10. The computer-implemented method of claim 4, further comprising:
while displaying the second functional level, detecting a second clutch input; and
causing a transition of the display from the second functional level to the first functional level of the computing device based upon a navigation direction in the detected second clutch input.

11. The computer-implemented method of claim 4, wherein the first functional level is associated with displaying an application and the second functional level is associated with displaying the application and chrome associated with the application.

12. The computer-implemented method of claim 4, wherein the second functional level is a locked-screen state.

13. The computer-implemented method of claim 4, wherein the first functional level is an application and the second functional level includes a menu of at least two applications running on the computing device.

14. A computing device, comprising:
a display screen;
a processor; and
a memory device including instructions that, when executed by the processor, cause the computing device to:
display content associated with a first functional level on the display of the computing device;
detect a clutch input performed by a user, the clutch input to determine a navigation direction between functional levels among a plurality of functional levels;
after detecting the clutch input, detect a multiple finger splay gesture performed by the user, the multiple finger splay gesture being a different gesture than the clutch input;
upon detecting the multiple finger splay gesture, cause a transition of the display from the first functional level to a second functional level of the computing device based upon the navigation direction in the detected clutch input; and
display content associated with the second functional level of the computing device.

15. The computing device of claim 14, wherein the first functional level is associated with displaying an application and the second functional level is associated with displaying the application and chrome associated with the application.

16. The computing device of claim 14, wherein the second functional level is a locked-screen state.

17. The computing device of claim 14, wherein the multiple finger splay gesture is detected by at least one imaging sensor of the computing device.

18. The computing device of claim 14, wherein the display is a touch display and wherein the multiple finger splay gesture is detected through contact with the touch display.

19. A non-transitory computer-readable medium including instructions for displaying content, the instructions when executed by a processor of a portable computing device causing the portable computing device to:

display content associated with a first functional level on a display of a computing device;

detect a clutch input performed by a user, the clutch input to determine a navigation direction between functional levels among a plurality of functional levels;

after detecting the clutch input, detect a multiple finger splay gesture performed by the user, the multiple finger splay gesture being a different gesture than the clutch input;

upon detecting the multiple finger splay gesture, cause a transition of the display from the first functional level to a second functional level of the computing device based upon the navigation direction of the detected clutch input; and display content associated with the second functional level of the computing device.

20. The non-transitory computer-readable medium of claim 19, wherein the second functional level is a locked-screen state.

21. The non-transitory computer-readable medium of claim 19, wherein the first functional level is an application and the second functional level includes a menu of at least two applications running on the computing device.

22. The non-transitory computer-readable medium of claim 19, wherein the first functional level is an application and the second functional level includes a miniature view of at least two pages of the application.

23. The non-transitory computer-readable medium of claim 19, wherein the computing device includes the plurality of functional levels and a number of fingers used when performing the multiple finger splay gesture determines which functional level among the plurality of functional levels is to be displayed to the user.

24. The non-transitory computer-readable medium of claim 19, wherein the first functional level is a home screen and the second functional level is a network map view of a network that includes a location of at least one other user.

* * * * *